United States Patent [19]

Corona et al.

[11] Patent Number: 4,819,185

[45] Date of Patent: Apr. 4, 1989

[54] METHOD AND APPARATUS FOR DRAWING WIDE LINES IN A RASTER GRAPHICS DISPLAY SYSTEM

[75] Inventors: James Corona, Kingston; Yoshio Iida, Lake Katrine, both of N.Y.

[73] Assignee: International Business Machines Corporation, Armonk, N.Y.

[21] Appl. No.: 820,762

[22] Filed: Jan. 17, 1986

[51] Int. Cl.[4] .............................................. G06F 15/40

[52] U.S. Cl. ..................................... 364/518; 340/139

[58] Field of Search ................ 364/518, 521; 340/703, 340/734, 729, 739; 382/44–47

[56] References Cited

U.S. PATENT DOCUMENTS 4,607,340 8/1986 Nagai ................................. 364/521

*Primary Examiner*—Gary V. Harkcom

*Assistant Examiner*—H. R. Herndon

*Attorney, Agent, or Firm*—George E. Clark

[57] ABSTRACT

A technique for efficiently drawing wide lines in a graphics display system by method and apparatus which includes identifying a wide line to be drawn; drawing a first line of pixels of a wide line; determining if a next line in the wide line has a different first coordinate value from a first coordinate value of the first line; generating at least one additional pixel value for the next line if the first coordinate value of the next line is different from the first coordinate value of an immediately previously drawn line; repeating the steps until the wide line has been completely drawn.

8 Claims, 3 Drawing Sheets

METHOD AND APPARATUS FOR DRAWING WIDE LINES IN A RASTER GRAPHICS DISPLAY SYSTEM

BACKGROUND OF THE INVENTION

1. Field of the Invention

The present invention relates to information handling systems and more particularly to information handling systems including method and apparatus for drawing graphic representations of lines on a display device.

2. Description of the Prior Art

In the prior art, wide lines were drawn in graphics display systems employing stacked Bresenham generated lines. However, this prior art method has the following inherent difficulty.

Holes are left in the wide line whenever the starting X value of a stacked line shifts from the previous drawn line. When additional lines are draw in this prior art mode, to ensure coverage of those holes, performance is degraded due to the necessity for repetitive line drawing. Further, drawing of additional Bresenham mode lines generally causes some pixels to be drawn multiple times which presents further difficulties in determining whether the wide line being drawn is overlaying the background or some structure which is not background such as another line or a filled area.

SUMMARY OF THE INVENTION

Therefore, it is an object of the present invention to efficiently draw wide lines in a graphics display system by method and apparatus which includes means for identifying a wide line to be drawn; drawing a first line on pixels of said wide line; determining if a next line in said wide line has a different first coordinate value from a first coordinate value of said first line; generating at least one additional pixel value for said next line if said first coordinate value of said next line is different from said first coordinate value of an immediately previously drawn line; repeating said steps until said wide line has been completely drawn.

It is another object of the present invention to draw wide lines in a graphic display system wherein a first coordinate value is along an X axis and the additional pixel value to be generated is at location X+1, Y.

It is yet another object of the present invention to draw wide lines in a graphics display system as described above wherein the first line to be drawn is a bottom or lowest Y value line of the wide line and next lines have greater Y values then preceding lines drawn to generate the wide line.

It is another object of the present invention to draw wide lines in a graphics display system as described above wherein the first line of the wide line is a top or highest Y value line and next lines to be drawn have decreasing Y values for the starting point of the next lines.

Accordingly, method and apparatus according to the present invention includes means for identifying a wide line to be drawn; means for drawing a first line of pixels of said wide line; means for determining if a next line in said wide line has a different first coordinate value from a first coordinate value of said first line, and means for generating at least one additional pixel value for next line of said first coordinate value of said next line is different from said first coordinate value of an immediately previously drawn line.

The foregoing and other objects, features and advantages of the invention will be apparent from the more particular description of the preferred embodiments of the invention, as illustrated in the accompanying drawing.

BRIEF DESCRIPTION OF THE DRAWING

In the drawing, like elements are designated with similar reference numbers, and identical elements in different specific embodiments are designated by identical reference numbers.

DESCRIPTION OF PREFERRED EMBODIMENTS OF THE INVENTION

Figure 1:
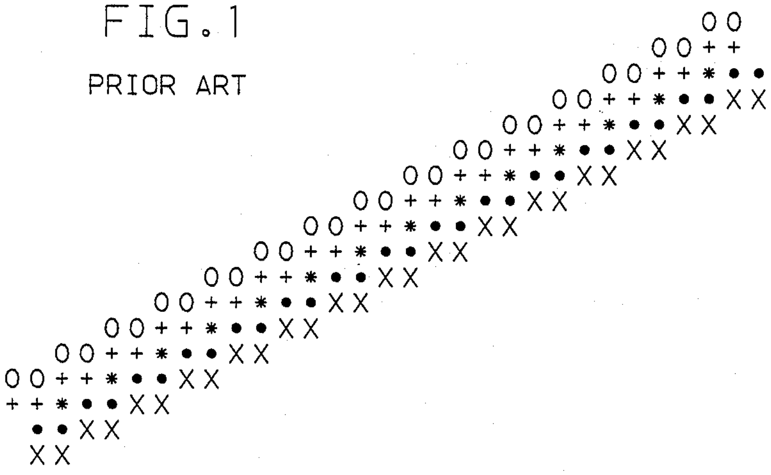
FIG. 1 PRIOR ART
FIG. 1 is a graphic representation of a prior art wide line drawn by using a stacked Bresenham line generator wherein the first line drawn is indicated by x, the second line of the wide line is indicated by ., the third line is indicated by + and the fourth line in the wide line is indicated by o, and the holes in the wide line are indicated by *.

In graphics display systems there is a need for the ability to draw lines on a raster graphics display having a width greater than a single pixel. Generally, wide lines have been drawn in the past using stacked lines generated by the Bresenham line generation algorithm. This prior art method which is shown in FIG. 1, generally left holes (marked by *) in the wide lines whenever the starting X value of a stack line shifted left from the previous drawn line. If those holes were to be covered, additional lines had to be drawn thus degrading performance of the system.

The present invention employs an improved vector generator which recognizes the need to draw additional pixels to fill holes whenever a starting coordinate value such as X or Y is decremented (in the first octant) from the starting coordinate value of the previous line in the wide line.

Figure 2:
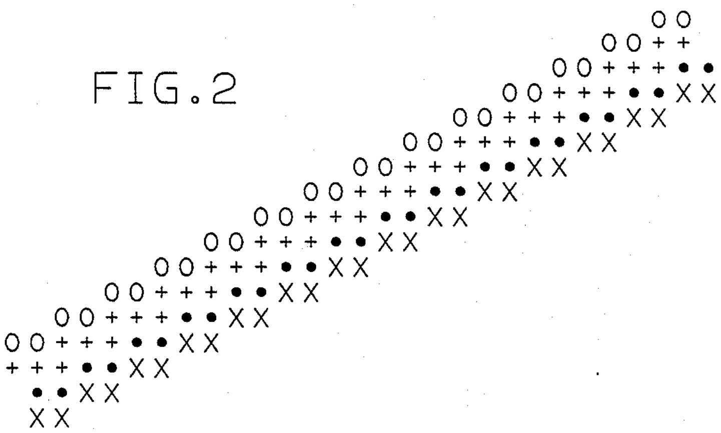
FIG. 2 is a graphic representation of a wide line drawn in accordance with the method of the present invention, wherein x represents pixels drawn for the first line, . represents pixels drawn for the second line, + represent pixels drawn for the third line and o represents pixels drawn for the fourth line of the wide line.

FIG. 2 shows a wide line drawn by the method and apparatus according to the present invention, wherein x represents pixels drawn for the first line of the wide line, . represents pixels drawn for the second line, + represent pixels drawn for the third line, and o represents pixels drawn for the fourth line of the wide line.

Figure 4:
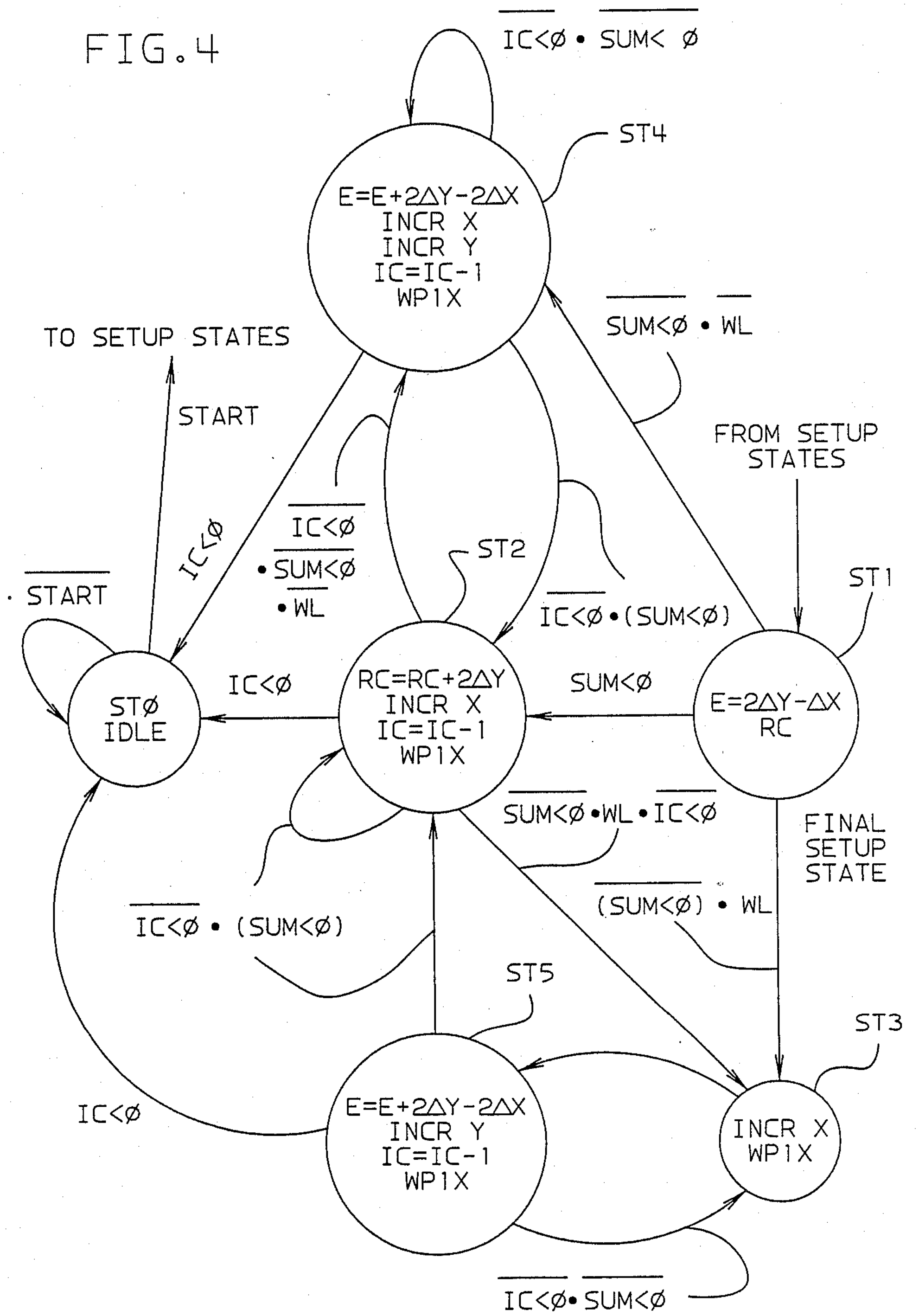
FIG. 4 is a state diagram of a vector generator operation in accordance with the method of the present invention.

The vector generator has an additional state, shown in the state diagram of FIG. 4, which plots points X+1, Y and X+1, Y+1, whenever a line Y value is incremented to Y+1, which covers the hole at location X+1, Y.

Figure 3:
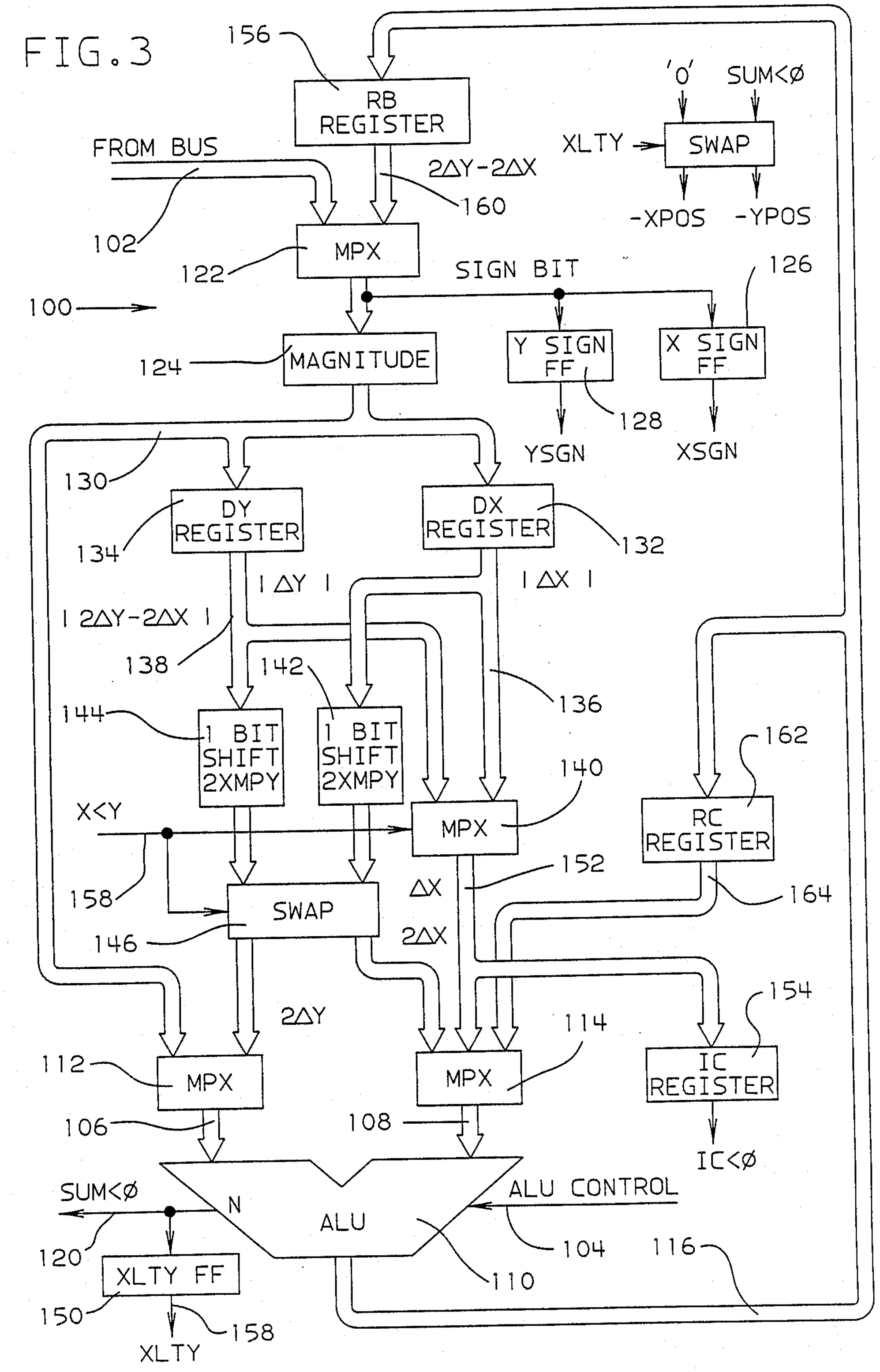
FIG. 3 is a block diagram of a vector generator embodying the present invention.

Referring now to FIG. 3, a vector generator in accordance with the present invention will be described.

The setup procedure for the vector generator shown in FIG. 3 is described in U.S. patent application Ser. No. 820,763. At the heart of vector generator 100 is ALU 110 having bus inputs 106 (left) and 108 (right) from multiplexers 112 and 114 respectively and having a bus output 116 and a sign bit 120 at N indicating SUM<0 when active.

Delta X and delta Y values are input to vector generator 100 on bus 102 which provides a first input to multiplexer 122. During a first time period, multiplexer 122 is enabled by sequence logic of a display controller such as IBM 5080 (not shown) so that the data on bus 102 is fed through absolute magnitude logic 124 which determines the absolute magnitude of the value of either delta X of delta Y appearing on bus 102 at any period of time. A sign bit output of multiplexer 122 is also fed to inputs to X sign flip flop 126 and Y sign flip flop 128. The appropriate sign flip flop to be activated by the sign bit output from multiplexer 122 is enabled by the sequencer not shown. The output of absolute magnitude logic 124 is fed on bus 130 to inputs to delta X register 132, delta Y register 134 and left ALU multiplexer 112.

Next, a value for delta Y is placed on bus 102 and is fed through multiplexer 122 where the sign bit is identified and used to activate Y sign flip flop 128. The magnitude of delta Y is then determined by magnitude logic 124 and the absolute magnitude of delta Y is loaded into delta Y register 134.

The delta X output from delta X register 132 is fed on bus 136 to multiplexer 140 and to hard wired two times multiplier 142. The magnitude of delta Y output output of delta Y register 134 is fed on bus 138 to a second input of multiplexer 140 and to hard wired two times multiplier 144.

During a first pass, the output of multiplier 142 now represents 2 delta X and the output of multiplier 144 represents 2 delta Y.

During vector generator setup, X less than Y of flip flop 150 is initialized so that X less than Y output 158 is zero, which assumes that delta X is greater than or equal to delta Y. X less than Y line 158 controls swap logic 146 and multiplexer 140. In the initial state, with line 158 equal to zero, there is no swap performed. Thus the output of multiplier 142 is fed through to a left-most input of multiplexer 114 which is the right-hand multiplexer for ALU 110 and the output of multiplier 144 is fed through swap logic 146 to a right-input of multiplexer 112 which is the left-hand input to ALU 110.

Similarly, the output of multiplexer 140 representing at this time the absolute magnitude of delta X, on bus 152 is fed to a second input of multiplexer 114 and into an input of iteration counter 154. A first computation to be performed by ALU 110 is the operation 2 delta Y minus 2 delta X. The subtraction is controlled by ALU control line 104 from the graphics processor sequencer. The output of the ALU on bus 116 is inputted to RB register 156 which now stores the quantity 2 delta Y minus 2 delta X.

Also as a result this computation, the sign bit of the result which appears at line 120 is stored in the X less than Y flip flop 150 which provides the active control line 158 to swap logic 146 and multiplexer 140.

Line 158 controls the inputs to multiplexer 112 and 114 respectively such that if line 158 is active, 2 delta X is fed to multiplexer 112 and 2 delta Y is fed to multiplexer 114 resulting in an actual computation of 2 delta X minus 2 delta Y rather than 2 delta Y minus 2 delta X.

Of course, the ALU merely subtracts the inputs presented on lines 108 from the inputs presented on lines 106 to achieve the desired result.

In the next cycle, 2 delta Y appearng on lines 106 is fed to the left side of ALU 110 and delta X from multiplexer 140 through multiplexer 114 under the control of the graphics processor sequencer is fed on lines 108 to the right side of ALU 110 so that the output on bus 116 is the quantity 2 delta Y minus delta X.

This quantity is fed to RC register 162 where it is stored.

The output 164 of RC register 162 is a third input to multiplexer 114 which feds the right side of ALU 110.

Vector generator setup is complete at this point. During vector generator setup, ALU 110 performs only subtraction operations in each of the two cycles of setup.

OPERATION

Referring now to FIGS. 3 and 4 the generation of a wide line for display with no holes in the stack will be described.

The system starts out in state 0, the idle state. When a start signal is received, the system moves to the setup state which is described in U.S. patent application Ser. No. 820,763.

After setup has been completed, the system returns to state 1 represented by the circle at the right-hand side of FIG. 4. In state 1, there is stored in register RC 162 the quantity 2 delta Y minus delta X which will be referred to as the error term.

In drawing a wide line, there may be several of the component lines drawn employing a "normal" or Bresenham mode (that is without adding a pixel at point X+1, Y). Lines 1, 2, and 4 shown in FIG. 2 are drawn in the "normal" mode. In the normal mode, the wide line mode signal WL is inactive or 0.

Line 120, the (sum less than 0) signal from ALU 110 is tested. If the sum is less than 0 and the signal is active, the system moves to state 2 at the center of FIG. 4. The contents of RC register 162, 2 delta Y minus delta X, is added to 2 delta Y and stored back into RC register 162. The value of X is incremented which moves to the next pixel position and the iteration counter 154 is decremented by 1. A write pixel at current position signal WPIX is then issued which draws a pixel at the current X,Y coordinate location.

The drawing of lines in the "normal" mode is the use of the Bresenham algorithm which is described in "Fundamentals of Interactive Computer Graphics", by Foley and Van Dam, Addison, Wesely Publishing Company, 1982 at Page 435. The signal "sum less than 0" physically represents an X axis increment along the line to be drawn with no Y axis increment. Thus, referring to FIGS. 1 and 2, the first line drawn which is represented by the character X, the system moves from state 1 to state 2 and the first X is drawn.

The system loops in state 2 as long the iteration counter is not 0 and line 120 "sum less than 0" is active, indicating a horizontal line being drawn along the X axis. In the example shown in FIGS. 1 and 2, there would be 2 pixels drawn along the X axis before the Y increment while the system remains in state 2.

With the next pixel position to be examined, the signal "sum less than 0" would be turned off, which physically represents an increment along the Y axis. Since the bottom line of FIG. 2 is being drawn in the "normal" Bresenham mode and the iteration counter is not equal to 0, the increment Y with the increment in X causes the system to move from state 2 to state 4 where X is incremented, Y is incremented, the iteration counter is decremented by 1 and the pixel is drawn by the generation of the signal WPIX. Also, the error term stored in RC register 162 is updated by adding a new value of the quantity 2 delta Y minus 2 delta X. Since the next pixel to be drawn represents only a change in the X axis and no change in the Y axis, the "sum less than 0" signal is turned on and the system returns from state 4 to state 2 (assuming that the iteration counter is still greater or equal to 0). In state 2 the next X axis pixel is drawn and the system continues to move between states 2 and 4 as described above for drawing lines in the normal of Bresenham mode which are not characterized as wide lines. That is they are not lines which must have an additional pixel drawn at a position X+1, Y to fill holes in the line which would be left by the normal Bresenham algorithm.

The second and all other lines which are to be drawn in normal mode would be drawn with the same state sequences as the first line.

When the "wide line mode line" such as line 3 marked by +'s is to be drawn, the system recognizing wide line mode by the presence of an active signal WL and an increment in the Y coordinate by the signal sum less than 0 being inactive, and assuming that the iteration counter is not less than 0, moves to state 3 where the X value is incremented and the signal WPIX is generated drawing a pixel at the location where the normal mode would have left a hole, X+1, Y. The system always moves from state 3 to state 5 where the error term stored in RC register 162 is updated with the quantity 2 delta X minus 2 delta Y, the Y coordinate value is incremented, the iteration counter is decremented and another pixel is drawn by the generation of signal WPIX. If there is another increment in the Y coordinate value while the system is in state 5, control is passed back to state 3 where the X value is incremented and another pixel is drawn. When the next move is to be made along the X axis with no Y increment, the sum less than 0 signal becomes active and the system returns control to state 2. The system continues to loop from states 2 to 4 in normal mode or states 2, 3, 5 in "wide line mode" until all component lines of a wide line have been drawn, at which point, the iteration counter is at 0 and the system moves to state 0, the idle state.

Thus, the addition of two control states, state 3 and state 5 permit the drawing of wide lines without holes in an efficient manner without interference with other elements of the display.

Thus, while the invention has been described with reference to preferred embodiments thereof, it will be understood by those skilled in the art that various changes in form and details may be made without departing from the scope of the invention.

What is claimed is:

1. Apparatus for efficiently drawing wide lines in a graphics display system comprising:
   - means for identifying a wide line to be drawn;
   - means for drawing a line of pixels of said wide line;
   - means for determining if a next line in said wide line has a different first coordinate value from the first coordinate value of a previous line;
   - means for generating at least one additional pixel at predetermined coordinate locations for said next line if said first coordinate value of said next line is different from said first coordinate value of an immediately previously drawn line to fill holes in said wide line at said predetermined coordinate locations; and
   - means for repeating said steps until said wide line has been completely drawn.

2. Apparatus according to claim 1, wherein a first coordinate value is along an X axis and the additional pixel value to be generated is at location X+1, Y.

3. Apparatus according to claim 1, wherein a first line to be drawn is a bottom or lowest Y value line of the wide line and next lines have greater Y values then preceding lines drawn to generate the wide line.

4. Apparatus according to claim 1, wherein a first line of the wide line is a top or highest Y value line and next lines to be drawn have decreasing Y values for the starting point of the next lines.

5. A method for efficiently drawing wide lines in a graphics display system comprising the steps of:
   - identifying a wide line to be drawn;
   - drawing a line of pixels of said wide line;
   - determining if a next line in said wide line has a different first coordinate value from the first coordinate value of a previous line;
   - generating at least one additional pixel at predetermined coordinate locations for said next line if said first coordinate value of said next line is different from said first coordinate value of an immediately previously drawn line to fill holes in said wide line at said predetermined coordinate locations; and
   - repeating said steps until said wide line has been completely drawn.

6. A method according to claim 5, further comprising the step of: generating a pixel value for coordinate location X+1, Y.

7. A method according to claim 5, wherein a first line to be drawn is a bottom or lowest Y value line of the wide line and next lines have greater Y values than preceding lines drawn to generate the wide line.

8. A method according to claim 5, wherein a first line of the wide lines is a top or highest Y value line and next lines to be drawn have decreasing Y values for the starting point of the next lines.

* * * * *